United States Patent
Ray et al.

(10) Patent No.: US 9,872,304 B1
(45) Date of Patent: Jan. 16, 2018

(54) PACKET FRAGMENTATION FOR VOLTE COMMUNICATION SESSIONS

(71) Applicant: Sprint Communications Company L.P., Overland Park, KS (US)

(72) Inventors: Amar Nath Ray, Shawnee, KS (US); Manoj Monga, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 527 days.

(21) Appl. No.: 14/086,620

(22) Filed: Nov. 21, 2013

(51) Int. Cl.
H04W 72/08 (2009.01)

(52) U.S. Cl.
CPC .................. H04W 72/087 (2013.01)

(58) Field of Classification Search
CPC .................................... H04W 72/087
See application file for complete search history.

(56) References Cited

U.S. PATENT DOCUMENTS

2011/0242998 A1* 10/2011 Lee et al. ..................... 370/252
2012/0281536 A1 11/2012 Gell et al.
2012/0327779 A1 12/2012 Gell et al.
2014/0362778 A1* 12/2014 Belghoul ..................... 370/329

OTHER PUBLICATIONS

GSMA Association, IMS Profile for Voice and SMS [online], Version 7.0, Mar. 3, 2013 [retrieved on Sep. 7, 2017]. Retrieved from the Internet: <URL: https://www.gsma.com/newsroom/wp-content/uploads/2013/04/IR.92-v7.0.pdf>, pp. 1-32.*

* cited by examiner

Primary Examiner — Omar Ghowrwal (57) ABSTRACT

A wireless access node to facilitate voice over long term evolution (VoLTE) communication sessions comprises a wireless communication transceiver and a processing system. The wireless communication transceiver is configured to exchange VoLTE packets with a wireless communication device during a VoLTE communication session, and receive a scheduling request and responsively issue a scheduling grant with a number of hybrid automatic repeat requests (HARQs). The processing system is configured to calculate a quality of service (QoS) score based on a communication quality of the VoLTE communication session after issuing the scheduling grant, and if the QoS score falls below a threshold value, apply a lower level of fragmentation to the VoLTE packets.

14 Claims, 6 Drawing Sheets

PACKET FRAGMENTATION FOR VOLTE COMMUNICATION SESSIONS

TECHNICAL BACKGROUND

Wireless communication devices transmit and receive information wirelessly via a wireless access node to communicate over a communication network. Typically, the wireless access node is part of a radio access network (RAN) which provides the wireless communication devices with access to further communication networks, systems, and devices. The wireless communication devices utilize forward link communication channels to receive voice and/or data transmitted from the wireless access node, and reverse link communication channels to transmit information up to the node.

Given the nature of transmitting information in the form of energy over the air, errors can be introduced while the data is in-route to its destination. These errors can be introduced from a variety of factors, such as environmental obstructions, distance between a sender and receiver, strength of the signal being transmitted, and others. This can be especially problematic during voice over long term evolution (VoLTE) communication sessions, where satisfactory performance relies on a constant, uninterrupted flow of voice and/or video data to ensure the parties are able to understand what is being communicated. To address these concerns, error control techniques for data transmissions may be utilized to achieve reliable data transmissions over an unreliable service. One such technique, termed hybrid automatic repeat request (HARQ), provides such error control by encoding data with a forward error correction (FEC) code. In addition, packets may also be fragmented to improve communication quality.

Overview

A method of operating a wireless access node to facilitate voice over long term evolution (VoLTE) communication sessions is disclosed. The method comprises exchanging VoLTE packets with a wireless communication device during a VoLTE communication session. The method further comprises receiving a scheduling request and responsively issuing a scheduling grant with a number of hybrid automatic repeat requests (HARQs). The method further comprises calculating a quality of service (QoS) score based on a communication quality of the VoLTE communication session after issuing the scheduling grant. The method further comprises, if the QoS score falls below a threshold value, applying a lower level of fragmentation to the VoLTE packets.

A wireless access node to facilitate voice over long term evolution (VoLTE) communication sessions comprises a wireless communication transceiver and a processing system. The wireless communication transceiver is configured to exchange VoLTE packets with a wireless communication device during a VoLTE communication session, and receive a scheduling request and responsively issue a scheduling grant with a number of hybrid automatic repeat requests (HARQs). The processing system is configured to calculate a quality of service (QoS) score based on a communication quality of the VoLTE communication session after issuing the scheduling grant, and if the QoS score falls below a threshold value, apply a lower level of fragmentation to the VoLTE packets.

A computer apparatus to facilitate voice over long term evolution (VoLTE) communication sessions comprises software instructions and at least one non-transitory computer-readable storage medium storing the software instructions. The software instructions are configured, when executed by a wireless access node, to direct the wireless access node to exchange VoLTE packets with a wireless communication device during a VoLTE communication session. The software instructions are further configured to direct the wireless access node to receive a scheduling request and responsively issue a scheduling grant with a number of hybrid automatic repeat requests (HARQs) and calculate a quality of service (QoS) score based on a communication quality of the VoLTE communication session after issuing the scheduling grant. The software instructions are further configured to direct the wireless access node to, if the QoS score falls below a threshold value, apply a lower level of fragmentation to the VoLTE packets.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
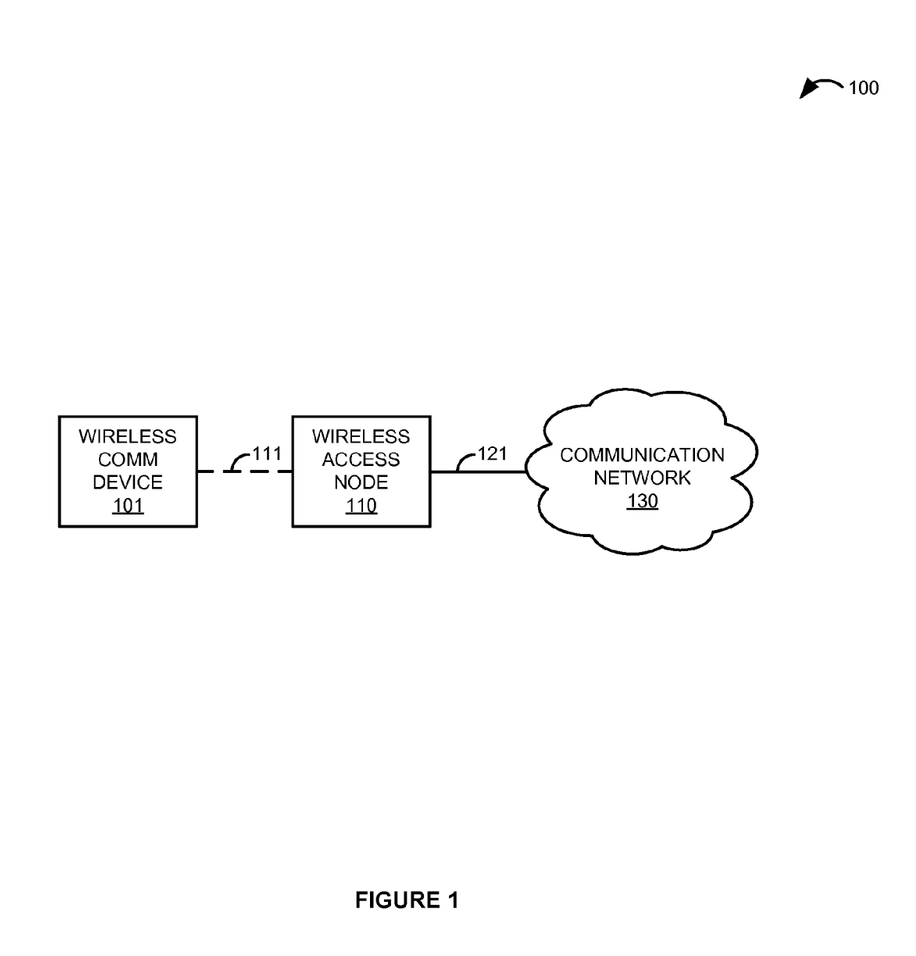
FIG. 1 is a block diagram that illustrates a communication system.

FIG. 1 is a block diagram that illustrates communication system 100. Communication system 100 includes wireless communication device 101, wireless access node 110, and communication network 130. Wireless communication device 101 and wireless access node 110 are in communication over wireless communication link 111. Wireless access node 110 and communication network 130 communicate over communication link 121.

Figure 2:
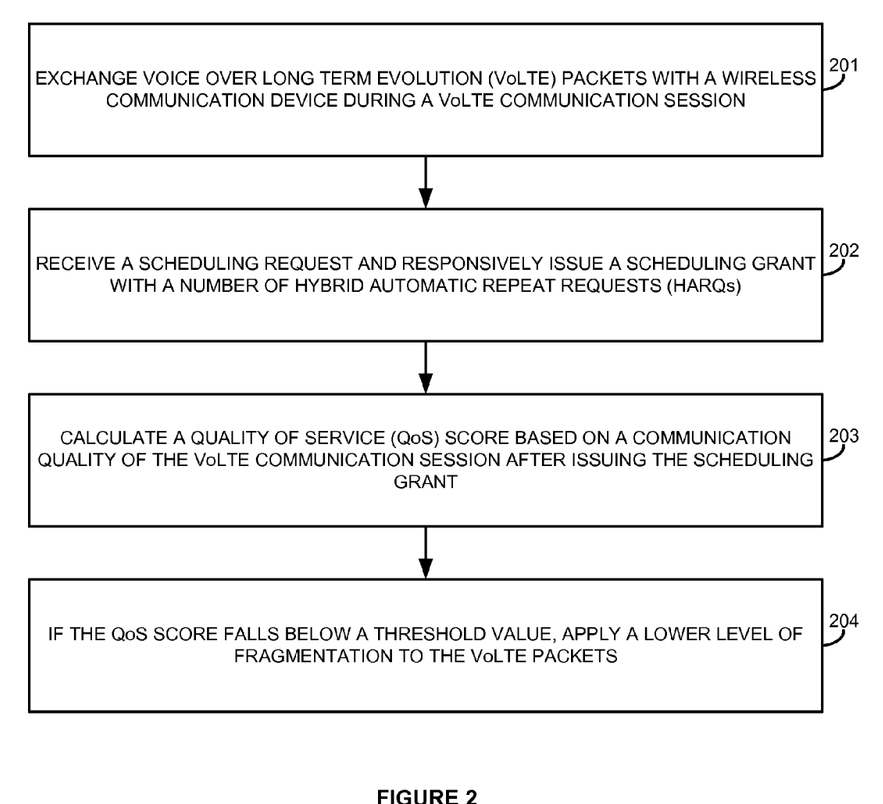
FIG. 2 is a flow diagram that illustrates an operation of the communication system.

FIG. 2 is a flow diagram that illustrates an operation of communication system 100. The steps of the operation are indicated below parenthetically. The operation of communication system 100 shown in FIG. 2 may be employed by wireless access node 110 to facilitate voice over long term evolution (VoLTE) communication sessions.

To begin, wireless access node 110 exchanges VoLTE packets with wireless communication device 101 during a VoLTE communication session (201). The VoLTE communication session typically comprises a real-time voice and/or video chat session, although other types of communication sessions that utilize VoLTE packets are also possible. The VoLTE packets exchanged between wireless access node 110 and wireless communication device 101 during the VoLTE communication session could comprise any type of data, such as packetized voice data, signaling messages, frames, or any other data message.

Wireless access node 110 receives a scheduling request and responsively issues a scheduling grant with a number of hybrid automatic repeat requests (HARQs) (202). Typically, wireless access node 110 receives the scheduling request transmitted from wireless communication device 101, although the request could originate in any network element, including internally within wireless access node 110 in some examples. The scheduling request is typically received by wireless access node 110 in response to a communication link problem experienced by wireless communication device 101 causing suboptimal voice and/or video quality. In order to improve the delivery process, wireless access node 110 issues the scheduling grant with a specified number of HARQ timeslots in response to the scheduling request. Typically, wireless access node 110 begins by issuing a scheduling grant to wireless communication device 101 with a minimum number of HARQs, but any number of HARQs could be specified. Each HARQ timeslot that is added by the scheduling grant typically increases transmission time delay, but also helps ensure the data is successfully communicated.

Wireless access node 110 calculates a quality of service (QoS) score based on a communication quality of the VoLTE communication session after issuing the scheduling grant (203). Typically, a voice/video quality inspection system within the wireless access node 110 (not shown) could analyze the voice quality of the VoLTE communication session after issuing the scheduling grant to determine the QoS score. In some examples, wireless access node 110 could calculate the QoS score based on the communication quality of the VoLTE communication session after issuing the scheduling grant by inspecting a voice quality of the VoLTE communication session after the scheduling grant has been issued. For example, wireless access node 110 could utilize speech recognition software and other speech analysis tool to calculate the QoS score based on the communication quality of the VoLTE communication session. In some examples, the voice/video quality inspection system could calculate the QoS of the VoLTE communication session prior to wireless access node 110 issuing the scheduling grant, and could communicate the scheduling request to the scheduler if the voice quality QoS score falls below a threshold.

If the QoS score falls below a threshold value, wireless access node 110 applies a lower level of fragmentation to the VoLTE packets (204). In some examples, the threshold QoS value may be predetermined, and is typically set at the minimum level of satisfactory communication quality. When applying the lower level of fragmentation, wireless access node 110 typically begins by equally splitting each of the VoLTE packets in half, resulting in two fragmented packets, but any level of fragmentation is possible and within the scope of this disclosure. Splitting a VoLTE packet in two results in the first half of the payload data being sent in a first fragmented packet and the second half of the payload being sent in a second fragmented packet, so transmission delay is doubled in this case as compared to sending the whole, unfragmented packet, but each of the fragmented packets require less signal strength to deliver and thus communication quality should improve. Additionally or alternatively to splitting the VoLTE packets in half, wireless access node 110 may fragment the VoLTE packets into thirds, quarters, or any other level of fragmentation when applying a lower level of fragmentation to the VoLTE packets, and would typically issue a modified scheduling grant to wireless communication device 101 in order to effectuate the fragmentation.

In some examples, after applying the lower level of fragmentation to the VoLTE packets, wireless access node 110 could calculate a new QoS score based on the communication quality of the VoLTE communication session after applying the lower level of fragmentation. For example, a voice/video quality inspection system within wireless access node 110 could analyze the communication quality of the VoLTE communication session after the fragmented packets are being transmitted and determine a new QoS score for the session. In this case, if the new QoS score still falls below the threshold value, wireless access node 110 could apply a higher level of fragmentation to the VoLTE packets. For example, if the initial fragmentation split the VoLTE packets in half, the higher level of fragmentation could split the packets into thirds. Then, in some examples, if the higher level of fragmentation applied to the VoLTE packets reaches a predetermined highest level, further fragmentation is not feasible, so wireless access node 110 may increase the number of HARQs by one in this case.

Advantageously, wireless access node 110 can continually monitor the QoS of a VoLTE communication session and apply fragmentation to VoLTE packets if necessary. By calculating a QoS score of the communication quality of the VoLTE communication session and comparing the QoS score to a threshold, wireless access node 110 can responsively apply different levels of fragmentation and/or increase a number of HARQs in a modified scheduling grant to wireless communication device 101 in an attempt to improve the communication quality. In this manner, a user of wireless communication device 101 will experience clearer voice and/or video quality, which may be especially important in emergency situations and other critical calls.

Referring back to FIG. 1, wireless communication device 101 comprises any device having wireless communication connectivity with hardware and circuitry programmed to function as a telecommunications device, such as Radio Frequency (RF) communication circuitry and an antenna. The RF communication circuitry typically includes an amplifier, filter, modulator, and signal processing circuitry. Wireless communication device 101 may also include a user interface, memory system, software, processing circuitry, or some other communication components. For example, wireless communication device 101 could comprise a telephone, transceiver, mobile phone, cellular phone, smartphone, computer, personal digital assistant (PDA), e-book, game console, mobile Internet device, wireless network interface card, media player, or some other wireless communication apparatus—including combinations thereof. Wireless network protocols that may be utilized by wireless communication device 101 include Code Division Multiple Access (CDMA) 1×RTT, Global System for Mobile communications (GSM), Universal Mobile Telecommunications System (UMTS), High-Speed Packet Access (HSPA), Evolution-Data Optimized (EV-DO), EV-DO rev. A, B, and C, Third Generation Partnership Project Long Term Evolution (3GPP LTE), LTE Advanced, Worldwide Interoperability for Microwave Access (WIMAX), IEEE 802.11 protocols (WI-FI), BLUETOOTH, Internet, telephony, or any other wireless network protocol that facilitates communication between wireless communication device 101 and wireless access node 110.

Wireless access node 110 comprises RF communication circuitry and an antenna. The RF communication circuitry typically includes an amplifier, filter, RF modulator, and signal processing circuitry. Wireless access node 110 may also comprise a router, server, memory device, software, processing circuitry, cabling, power supply, network communication interface, structural support, or some other communication apparatus. Wireless access node 110 could comprise a base station, Internet access node, telephony service node, wireless data access point, or some other wireless communication system—including combinations thereof. Some examples of wireless access node 110 include a base transceiver station (BTS), base station controller (BSC), radio base station (RBS), Node B, enhanced Node B (eNodeB), and others—including combinations thereof. Wireless network protocols that may be utilized by wireless access node 110 include CDMA, GSM, UMTS, HSPA, EV-DO, EV-DO rev. A, B, and C, 3GPP LTE, LTE Advanced, WIMAX, WI-FI, BLUETOOTH, Internet, telephony, or some other communication format—including combinations thereof.

Communication network 130 comprises the core network of a wireless communication service provider, and could include routers, gateways, telecommunication switches, servers, processing systems, or other communication equipment and systems for providing communication and data services. Communication network 130 could comprise wireless communication nodes, telephony switches, Internet routers, network gateways, computer systems, communication links, or some other type of communication equipment—including combinations thereof. Communication network 130 may also comprise optical networks, asynchronous transfer mode (ATM) networks, packet networks, radio access networks (RAN), local area networks (LAN), metropolitan area networks (MAN), wide area networks (WAN), or other network topologies, equipment, or systems—including combinations thereof. Communication network 130 may be configured to communicate over metallic, wireless, or optical links—including combinations thereof. Communication network 130 may be configured to use time-division multiplexing (TDM), Internet Protocol (IP), Ethernet, optical networking, wireless protocols, communication signaling, or some other communication format—including combinations thereof. In some examples, communication network 130 includes further access nodes and associated equipment for providing communication services to many wireless communication devices across a large geographic region.

Wireless communication link 111 uses the air or space as the transport medium. Wireless communication link 111 may use various protocols, such as CDMA, GSM, UMTS, HSPA, EV-DO, EV-DO rev. A, B, and C, 3GPP LTE, LTE Advanced, WIMAX, WI-FI, BLUETOOTH, Internet, telephony, or some other communication format—including combinations thereof. Wireless communication link 111 may comprise many different signals sharing the same link. For example, wireless communication link 111 could include multiple signals operating in a single propagation path comprising multiple communication sessions, frequencies, timeslots, transportation ports, logical transportation links, network sockets, IP sockets, packets, or communication directions—including combinations thereof.

Communication link 121 uses metal, air, space, optical fiber such as glass or plastic, or some other material as the transport medium—including combinations thereof. Communication link 121 could use various communication protocols, such as TDM, IP, Ethernet, telephony, optical networking, hybrid fiber coax (HFC), communication signaling, wireless protocols, or some other communication format—including combinations thereof. Communication link 121 may be a direct link or could include intermediate networks, systems, or devices.

Figure 3:
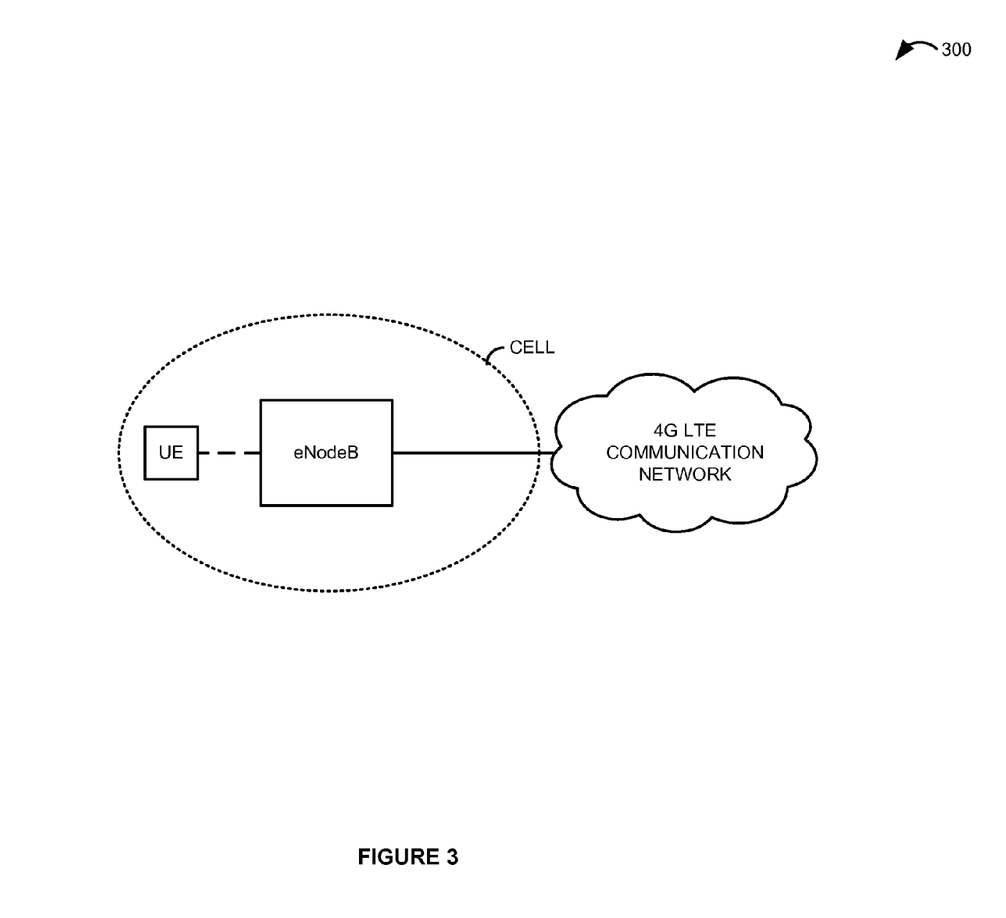
FIG. 3 is a block diagram that illustrates a communication system in an exemplary embodiment.

FIG. 3 is a block diagram that illustrates long term evolution (LTE) communication system 300 in an exemplary embodiment. LTE communication system 300 includes an enhanced Node B (eNodeB) base station that is in communication with the 4G LTE communication network. The eNodeB base station provides an example of wireless access node 110, although node 110 may use alternative configurations. 4G LTE communication network could include a mobility management entity (MME), serving gateway (SGW), packet data network gateway (PGW), and other network elements typically found in a 4G LTE communication network. The eNodeB shown has a wireless coverage area with approximate boundaries as indicated by the dotted line encircling it, which is typically defined by the signal propagation characteristics and coverage capabilities of the eNodeB. LTE communication system 300 also includes a user equipment (UE) device which is shown as being served by the eNodeB base station. The cell surrounding the eNodeB could be referred to as a serving cell for the UE located within it.

In operation, the UE issues scheduling requests to the eNodeB for resource allocation during each transmission time interval (TTI). Both uplink and downlink scheduling mechanisms are important, but for voice services over LTE, the uplink scheduler draws more attention with the successful development of VoLTE. The uplink scheduling process includes a scheduling request transmitted by the UE to the scheduler in the eNodeB, which responds with an appropriate scheduling grant. The UE may then provide data and buffer status to the scheduler so the scheduler can assess the efficacy of the scheduling grant. A detailed description of how the scheduler might conduct intelligent fragmentation of VoLTE packets will now be discussed with respect to FIG. 4.

Figure 4:
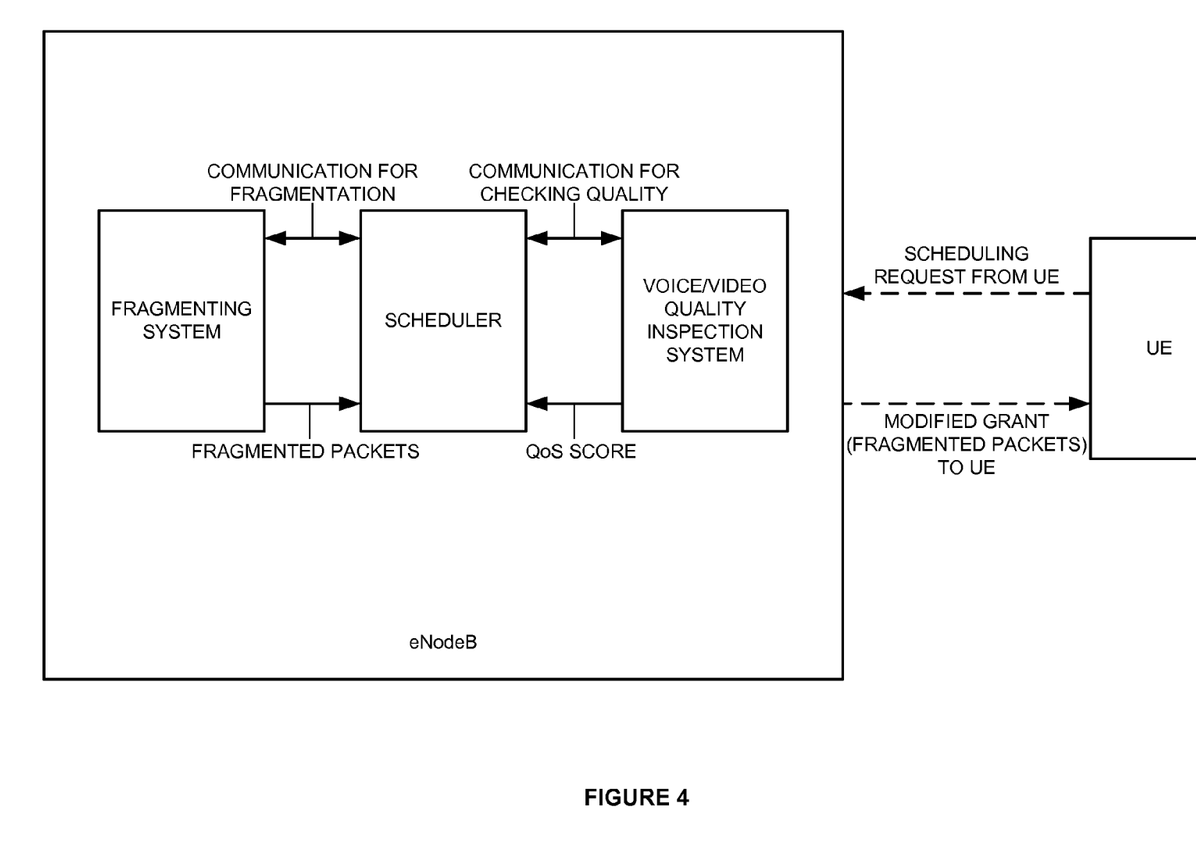
FIG. 4 is a block diagram that illustrates an operation of an eNodeB in an exemplary embodiment.

FIG. 4 is a block diagram that illustrates an operation of an eNodeB in an exemplary embodiment. In this example, the eNodeB includes a fragmenting system, scheduler, and a voice/video quality inspection system. Although not shown, the scheduler includes a controller which is responsible for the following operations.

Initially, upon identifying a communication link problem during a VoLTE communication session, the UE will send a scheduling request to the scheduler in the eNodeB in an attempt to improve the delivery process. With the direction of the controller, the fragmenting system will typically split the VoLTE packet into two smaller packets as an initial grant.

In operation, the controller within the scheduler needs to communicate between the fragmenting system and the voice/video quality inspection system to make a balance. The controller will make the balance between scheduling and fragmentation based on a predefined database that relates total delay to QoS values. Based on the total delay, the controller will retrieve the QoS value from the predefined database and then compare it with the actual QoS score as calculated by the voice/video quality inspection system. For example, if the total allowed delay is set to 50 milliseconds (ms), and adding one HARQ increases the time delay by 16 ms, then the controller cannot allow more than three HARQs, which adds 48 ms of delay. The extra 2 ms can be used for fragmentation, where the time delay is only increased by 1 ms for a single packet fragmentation. A difference between the QoS value in the database and the actual QoS score calculated by the voice/video quality inspection system indicates how well the fragmented packets are attached or received. Based on this difference and looking at the database, the controller can rebalance the process, such as by proceeding to further levels of fragmentation or by changing the number of HARQs, for example.

In some examples, if the UE and/or its user is not satisfied with the effect of the initial scheduling grant, a more stringent scheduling request may be issued by the UE. Based on the modified scheduling request from the UE, the scheduler may allow more splitting of the packets depending on the QoS score provided by the voice/video quality inspection system. Typically, the communication quality is analyzed by the voice/video quality inspection system to generate the QoS score, which is provided to the scheduler. Based on the QoS score, the scheduler then communicates the level of fragmentation needed to the fragmenting system, which fragments the packets accordingly. A modified scheduling grant having the fragmented packets is then sent to the UE. A similar process flow will now be described in further detail with respect to FIG. 5.

Figure 5:
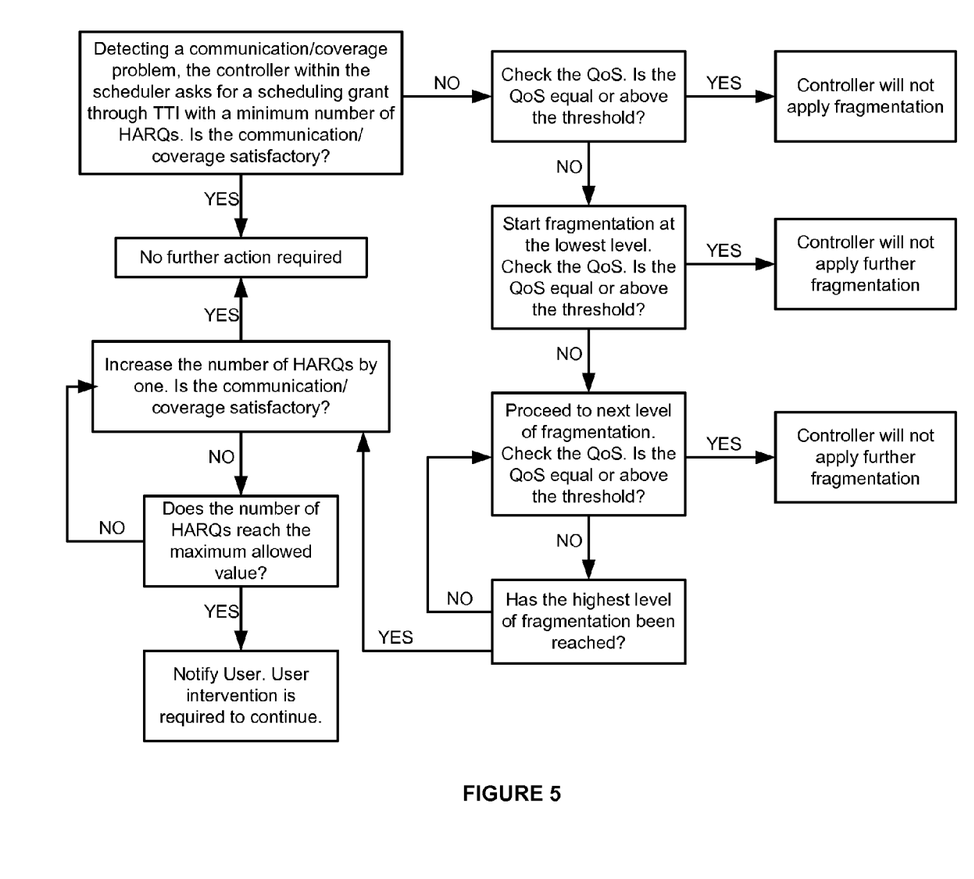
FIG. 5 is a flow diagram that illustrates an operation of a communication system in an exemplary embodiment.

FIG. 5 is a flow diagram that illustrates an operation of communication system 300 in an exemplary embodiment. The process flow begins at the topmost left box, where a communication/coverage problem is detected during a VoLTE communication session, and the controller within the scheduler requests a scheduling grant through transmission time interval (TTI) with a minimum number of HARQs. After issuing this scheduling grant, the communication/coverage is checked to determine if the problem has been alleviated. If the communication/coverage is satisfactory, no further action is required. However, if the communication/coverage is not satisfactory, then the voice/video quality inspection system generates a QoS score, which the controller compares to a threshold. If the QoS score is equal to or above the threshold, then the controller will not apply fragmentation to the VoLTE packets. However, if the QoS score falls below the threshold, then the controller will start fragmentation at the lowest level, which is typically to split the packets into two equal halves. Note that fragmentation creates some packet delay, but it is a lot less in comparison to the TTI delay or the delay introduced by adding HARQs.

A new QoS score is calculated by the voice/video quality inspection system after the fragmenting system applies the lowest level of fragmentation to the VoLTE packets, and this new QoS score is again compared to the threshold value. If the new QoS score is equal to or above the threshold, then the controller will not apply further fragmentation. If the new QoS score falls below the threshold, then the controller may proceed to the next level of fragmentation. For example, if the lowest level of fragmentation was splitting the packets into halves, the next level of fragmentation could comprise splitting the packets into thirds or quarters.

After applying the next level of fragmentation, the QoS score is again recalculated by the voice/video quality inspection system and compared to the threshold. If the QoS score is equal to or exceeds the threshold, then the controller will not apply further fragmentation. However, if the QoS score still falls below the threshold, then the controller will proceed to the next level of fragmentation, provided the highest level of fragmentation has not been reached.

If the highest level of fragmentation has been reached, the controller will not apply further fragmentation. Instead, the controller will increase the number of HARQs by one, and then check the communication/coverage after adding the HARQ cycle. If the communication cover is satisfactory, then no further action is required. However, if the communication/coverage is not satisfactory, then controller determines if the number of HARQs has reached the maximum allowed value. For example, for a total allowed delay of 50 ms, the maximum allowed number of HARQs would be three, since each HARQ adds 16 ms of time delay. If the maximum number of HARQs has not been reached, then the controller can increment the number of HARQs by one and again check the communication/coverage for satisfactory performance. However, once the maximum number of HARQs has been reached and the communication/coverage remains unsatisfactory, the user of the UE should be notified, as user intervention is required to continue. Typically, the need for user intervention should occur rather infrequently, since in most cases the controller should be able to effectively improve the communication quality by applying varying degrees of fragmentation and/or number of HARQs in modified scheduling grants to the UE.

Figure 6:
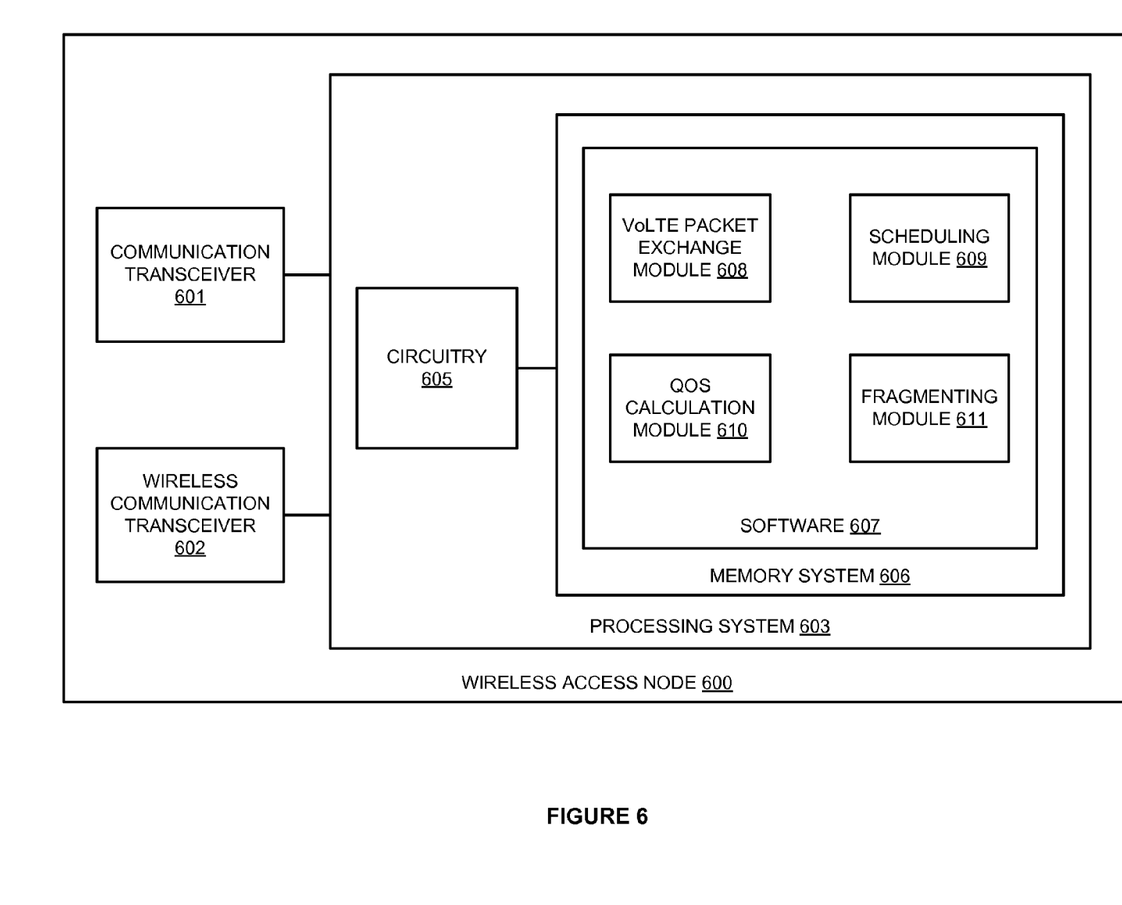
FIG. 6 is a block diagram that illustrates a wireless access node.

FIG. 6 is a block diagram that illustrates wireless access node 600. Wireless access node 600 provides an example of wireless access node 110, although node 110 may have alternative configurations. Wireless access node 600 comprises communication transceiver 601, wireless communication transceiver 602, and processing system 603. Processing system 603 is linked to communication transceiver 601 and wireless communication transceiver 602. Processing system 603 includes processing circuitry 605 and memory system 606 that stores operating software 607. Operating software 607 comprises software modules 608-611.

Communication transceiver 601 comprises components that communicate over communication links, such as network cards, ports, RF transceivers, processing circuitry and software, or some other communication components. Communication transceiver 601 may be configured to communicate over metallic, wireless, or optical links. Communication transceiver 601 may be configured to use TDM, IP, Ethernet, optical networking, wireless protocols, communication signaling, or some other communication format—including combinations thereof.

Wireless communication transceiver 602 comprises RF communication circuitry and an antenna. The RF communication circuitry typically includes an amplifier, filter, RF modulator, and signal processing circuitry. Wireless communication transceiver 602 may also include a memory system, software, processing circuitry, or some other communication device. Wireless communication transceiver 602 may use various protocols, such as CDMA, GSM, UMTS, HSPA, EV-DO, EV-DO rev. A, B, and C, 3GPP LTE, WIMAX, WI-FI, BLUETOOTH, Internet, telephony, or some other wireless communication format. Wireless communication transceiver 602 could be configured to exchange VoLTE packets with a wireless communication device during a VoLTE communication session. Wireless communication transceiver 602 could also be configured to receive a scheduling request and responsively issue a scheduling grant with a number of hybrid automatic repeat requests (HARQs).

Processing circuitry 605 comprises microprocessor and other circuitry that retrieves and executes operating software 607 from memory system 606. Processing circuitry 605 may comprise a single device or could be distributed across multiple devices—including devices in different geographic areas. Processing circuitry 605 may be embedded in various types of equipment. Memory system 606 comprises a non-transitory computer readable storage medium, such as a disk drive, flash drive, data storage circuitry, or some other hardware memory apparatus. Memory system 606 may comprise a single device or could be distributed across multiple devices—including devices in different geographic areas. Memory system 606 may be embedded in various types of equipment. In some examples, a computer apparatus could comprise memory system 606 and operating software 607. Operating software 607 comprises computer programs, firmware, or some other form of machine-readable processing instructions. Operating software 607 may include an operating system, utilities, drivers, network interfaces, applications, or some other type of software. In this example, operating software 607 comprises software modules 608-611, although software 607 could have alternative configurations in other examples.

When executed by circuitry 605, operating software 607 directs processing system 603 to operate as described herein for wireless access node 110. In particular, operating software 607 may direct processing system 603 to direct wireless communication transceiver 602 to exchange VoLTE packets with a wireless communication device during a VoLTE communication session. Operating software 607 directs processing system 603 to receive a scheduling request and responsively issue a scheduling grant with a number of hybrid automatic repeat requests (HARQs). Operating software 607 further directs processing system 603 to calculate a quality of service (QoS) score based on a communication quality of the VoLTE communication session after issuing the scheduling grant. Finally, if the QoS score falls below a threshold value, operating software 607 directs processing system 603 to apply a lower level of fragmentation to the VoLTE packets.

In this example, operating software 607 comprises a VoLTE packet exchange software module 608 that exchanges VoLTE packets with a wireless communication device during a VoLTE communication session. In addition, operating software 607 comprises a scheduling software module 609 that receives a scheduling request and responsively issues a scheduling grant with a number of hybrid automatic repeat requests (HARQs). Operating software 607 also comprises a QoS calculation software module 610 that calculates a quality of service (QoS) score based on a communication quality of the VoLTE communication session after issuing the scheduling grant. Finally, operating software 607 comprises a fragmenting software module 611 that applies a lower level of fragmentation to the VoLTE packets if the QoS score falls below a threshold value.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless access node to facilitate Voice over Long Term Evolution (VoLTE) communication sessions, the method comprising:
    exchanging VoLTE packets with a wireless communication device during a VoLTE communication session;
    receiving a scheduling request and responsively issuing a scheduling grant with a number of hybrid automatic repeat requests (HARQs);
    calculating a quality of service (QoS) score based on a communication quality of the VoLTE communication session after issuing the scheduling grant;
    when the QoS score falls below a threshold value, applying a higher level of fragmentation to the VoLTE packets, and
    when the higher level of fragmentation applied to the VoLTE packets reaches a predetermined highest level, then increase the number of HARQs by one which reaches a maximum number of HARQs.

2. The method of claim 1 wherein applying the higher level of fragmentation to the VoLTE packets comprises equally splitting each of the VoLTE packets into three fragmented packets.

3. The method of claim 1 further comprising issuing a modified scheduling grant to the wireless communication device after applying the higher level of fragmentation to the VoLTE packets.

4. The method of claim 1 wherein calculating the QoS score based on the communication quality of the VoLTE communication session after issuing the scheduling grant comprises inspecting a voice quality of the VoLTE communication session after issuing the scheduling grant.

5. The method of claim 1 wherein receiving the scheduling request comprises receiving the scheduling request transmitted from the wireless communication device.

6. A wireless access node to facilitate Voice over Long Term Evolution (VoLTE) communication sessions, the wireless access node comprising:
    a wireless communication transceiver configured to exchange VoLTE packets with a wireless communication device during a VoLTE communication session, and receive a scheduling request and responsively issue a scheduling grant with a number of hybrid automatic repeat requests (HARQs); and
    processing circuitry configured to calculate a quality of service (QoS) score based on a communication quality of the VoLTE communication session after issuing the scheduling grant, when the QoS score falls below a threshold value, apply a higher level of fragmentation to the VoLTE packets, and when the higher level of fragmentation applied to the VoLTE packets reaches a predetermined highest level, then increase the number of HARQs by one which reaches a maximum number of HARQs.

7. The wireless access node of claim 6 wherein the processing circuitry configured to apply the higher level of fragmentation to the VoLTE packets comprises the processing circuitry configured to equally split each of the VoLTE packets into three fragmented packets.

8. The wireless access node of claim 6 wherein the wireless communication transceiver is further configured to issue a modified scheduling grant to the wireless communication device after applying the higher level of fragmentation to the VoLTE packets.

9. The wireless access node of claim 6 wherein the processing circuitry configured to calculate the QoS score based on the communication quality of the VoLTE communication session after issuing the scheduling grant comprises the processing circuitry configured to inspect a voice quality of the VoLTE communication session after issuing the scheduling grant.

10. The wireless access node of claim 6 wherein the wireless communication transceiver configured to receive the scheduling request comprises the wireless communication transceiver configured to receive the scheduling request transmitted from the wireless communication device.

11. A computer apparatus to facilitate Voice over Long Term Evolution (VoLTE) communication sessions, the apparatus comprising:

one or more computer readable storage media;
circuitry;
software instructions stored on the one or more computer readable storage media to operate the VoLTE communication session that, when executed by circuitry, direct a wireless access node to exchange VoLTE packets with a wireless communication device during a VoLTE communication session; receive a scheduling request and responsively issue a scheduling grant with a number of hybrid automatic repeat requests (HARQs), calculate a quality of service (QoS) score based on a communication quality of the VoLTE communication session after issuing the scheduling grant, when the QoS score falls below a threshold value, apply a higher level of fragmentation to the VoLTE packets, and when the higher level of fragmentation applied to the VoLTE packets reaches a predetermined highest level, then increase the number of HARQs by one which reaches a maximum number of HARQs.

12. The computer apparatus of claim 11 wherein the software instructions configured to direct the wireless access node to apply the higher level of fragmentation to the VoLTE packets comprises the software instructions configured to direct the wireless access node to equally split each of the VoLTE packets into three fragmented packets.

13. The computer apparatus of claim 11 wherein the software instructions are further configured to direct the wireless access node to issue a modified scheduling grant to the wireless communication device after applying the higher level of fragmentation to the VoLTE packets.

14. The computer apparatus of claim 11 wherein the software instructions configured to direct the wireless access node to calculate the QoS score based on the communication quality of the VoLTE communication session after issuing the scheduling grant comprises the software instructions configured to direct the wireless access node to inspect a voice quality of the VoLTE communication session after issuing the scheduling grant.

\* \* \* \* \*